United States Patent
Ogawa et al.

(10) Patent No.: US 11,204,522 B2
(45) Date of Patent: Dec. 21, 2021

(54) LIGHTING DEVICE WITH SUBSTRATE AND REFLECTIVE SHEET AND DISPLAY DEVICE HAVING LIGHTING DEVICE WITH SUBSTRATE AND REFLECTIVE SHEET

(71) Applicant: Funai Electric Co., Ltd., Osaka (JP)

(72) Inventors: Akihisa Ogawa, Osaka (JP); Tatsuya Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/023,588

(22) Filed: Sep. 17, 2020

(65) Prior Publication Data

US 2021/0096425 A1    Apr. 1, 2021

(30) Foreign Application Priority Data

Sep. 26, 2019  (JP) .............................. JP2019-176058

(51) Int. Cl.
*G02F 1/13357* (2006.01)

(52) U.S. Cl.
CPC .. *G02F 1/133605* (2013.01); *G02F 1/133603* (2013.01)

(58) Field of Classification Search
CPC ......... G02F 1/133605; G02F 1/133603; G02F 1/133611; G02F 1/133608; G02F 2201/54
See application file for complete search history.

(56) References Cited

U.S. PATENT DOCUMENTS

| | | |
|---|---|---|
| 2013/0050589 A1 | 2/2013 | Kamada |
| 2016/0091759 A1 | 3/2016 | Lu et al. |
| 2019/0094618 A1 | 3/2019 | Kyoukane et al. |
| 2019/0391450 A1* | 12/2019 | Mukumoto ....... G02F 1/133608 |
| 2020/0183227 A1* | 6/2020 | Lee ................... G02F 1/133603 |
| 2021/0088846 A1* | 3/2021 | Ogawa ............. G02F 1/133603 |

FOREIGN PATENT DOCUMENTS

| | | |
|---|---|---|
| EP | 2 138 753 A1 | 12/2009 |
| JP | 2015-179191 A | 10/2015 |
| WO | 2011/152134 A1 | 12/2011 |

OTHER PUBLICATIONS

Kuragaki et al. (JP2015-179191, machine translation) (Year: 2015).*
The extended European search report for the corresponding European application No. 20196898.9, dated Jan. 15, 2021.

* cited by examiner

*Primary Examiner* — Tracie Y Green

(74) *Attorney, Agent, or Firm* — Global IP Counselors, LLP

(57) ABSTRACT

A lighting device includes a substrate, a light source and a reflective sheet. The light source is fixed relative to a surface of the substrate with a gap therebetween. The reflective sheet includes first and second portions that are separated with respect to each other and are arranged with respect to each other in a first direction. The reflective sheet is configured such that both the first and second portions are inserted into the gap between the light source and the surface of the substrate as viewed from a perpendicular direction, or such that one of the first and second portions extends through the gap between the light source and the surface of the substrate to a vicinity of the other one of the first and second portions that is provided outside of the light source as viewed from the perpendicular direction.

21 Claims, 9 Drawing Sheets

LIGHTING DEVICE WITH SUBSTRATE AND REFLECTIVE SHEET AND DISPLAY DEVICE HAVING LIGHTING DEVICE WITH SUBSTRATE AND REFLECTIVE SHEET

CROSS-REFERENCE TO RELATED APPLICATIONS

This application claims priority to Japanese Patent Application No. 2019-176058 filed on Sep. 26, 2019. The entire disclosure of Japanese Patent Application No. 2019-176058 is hereby incorporated herein by reference.

BACKGROUND

Field of the Invention

This invention generally relates to a lighting device and a display device. More specifically, the present invention relates to a lighting device and a display device equipped with a reflective sheet that expands and contracts with heat.

Background Information

Generally, lighting devices and display devices equipped with a reflective sheet that expands and contracts with heat are known (see International Publication WO 2011/152134 (Patent Literature 1), for example).

The Patent Literature 1 discloses a lighting device (a display device) comprising LED light sources, a substrate on which the LED light sources are mounted, and a reflective sheet provided on the substrate. The reflective sheet is provided with through holes corresponding to locations at which the plurality of LED light sources are disposed, respectively. The through holes have a square shape that is a size larger than an outer edge of the LED light sources as viewed from a perpendicular direction relative to the substrate. Legs that support the LED light sources from a bottom side of the LED light sources are disposed on the substrate. The LED light sources are supported by the legs, thereby providing gaps of a certain size between the LED light sources and the reflective sheet.

The reflective sheet is arranged to offset in a predetermined direction (an X direction) from a state in which the LED light sources are arranged so as to be surrounded by inner peripheral edge portions of the through holes as viewed from the perpendicular direction, respectively. As a result, one ends of the LED light sources in the predetermined direction (the X direction) are provided to overlap with the reflective sheet (the inner peripheral edge portions of the through holes) as viewed from the perpendicular direction. On the other hand, as viewed from the perpendicular direction, the other ends of the LED light sources in the predetermined direction (the X direction) do not overlap with the reflective sheet (the inner peripheral edge portions of the through holes). That is, as viewed form the perpendicular direction, the surface of the substrate is exposed as the reflective sheet is not provided between the reflective sheet (the inner peripheral edge portions of the through holes) and the other ends of the LED light sources.

SUMMARY

However, in the Patent Literature 1, as the substrate is exposed (no reflective sheet is provided) between the reflective sheet (the inner peripheral edge portions of the through holes) and the other ends of the LED light sources as viewed from the perpendicular direction, the reflectivity of the light in these areas is reduced. Due to this, there is a problem that the reflection efficiency of light in the lighting device (the display device) is reduced.

This invention has been made to solve the above-mentioned problems, and one object of this invention is to provide a lighting device and a display device capable of suppressing a decrease in the reflection efficiency of light in a lighting device (a display device).

In view of the state of known technology and in accordance with a first aspect of the invention, a lighting device comprises a substrate, a light source and a reflective sheet. The light source is fixed relative to a surface of the substrate with a gap therebetween. The reflective sheet is provided to cover the surface of the substrate. The reflective sheet includes first and second portions that are separated with respect to each other and are arranged with respect to each other in a first direction along the surface of the substrate. The reflective sheet is configured such that both the first and second portions are inserted into the gap between the light source and the surface of the substrate as viewed from a perpendicular direction that is perpendicular to the surface of the substrate, or such that one of the first and second portions extends through the gap between the light source and the surface of the substrate to a vicinity of the other one of the first and second portions that is provided outside of the light source as viewed from the perpendicular direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of a Backlight Unit and a Liquid Crystal Television Device)

Referring to FIGS. 1 to 8, the configuration of a backlight unit 10 and a liquid crystal television device 100 according to a first embodiment of the present invention will be described. The backlight unit 10 and the liquid crystal television device 100 are examples of the "lighting device" and the "display device" of the present disclosure, respectively.

Figure 1:
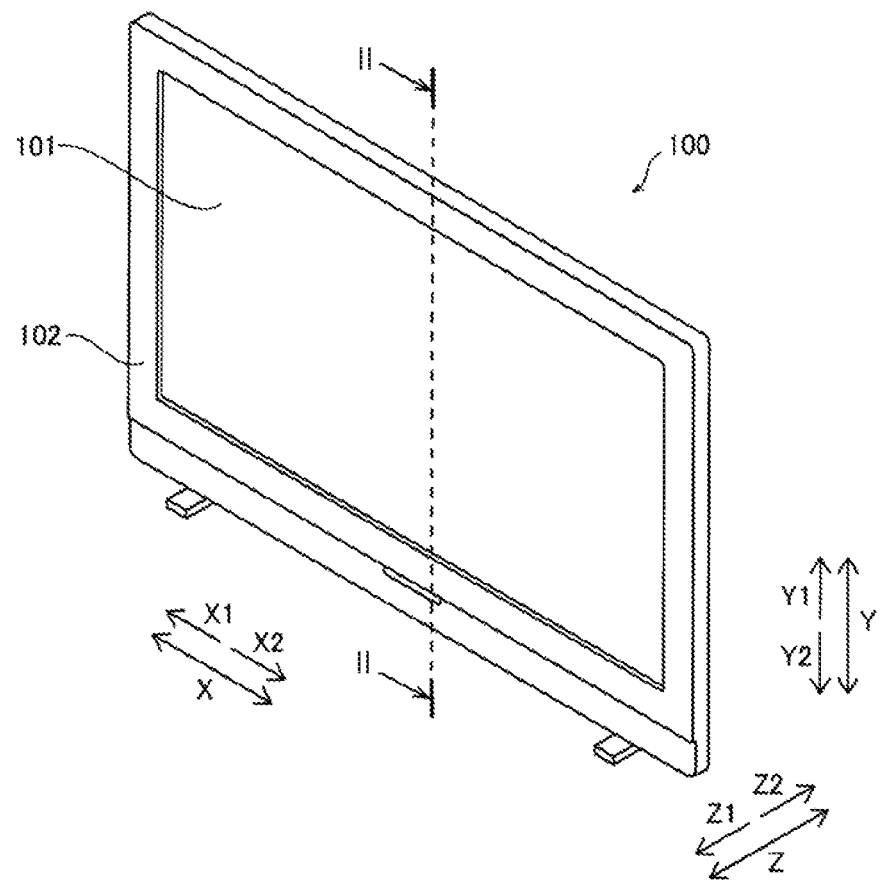
FIG. 1 is a perspective view illustrating the overall configuration of a liquid crystal television device in accordance with a first embodiment.

The liquid crystal television device 100 according to the first embodiment has a display 101 and a housing 102, as shown in FIG. 1.

Figure 2:
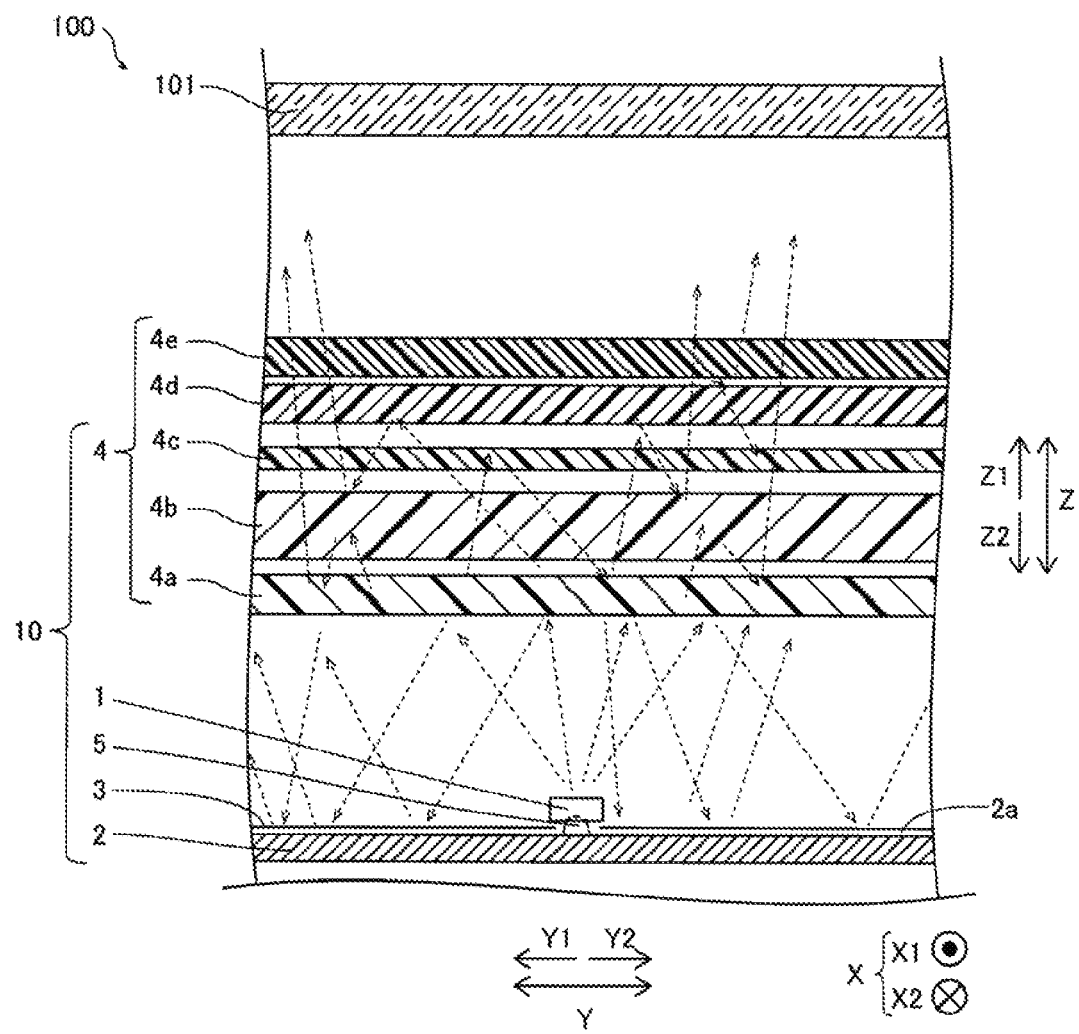
FIG. 2 is a cross-sectional view taken along II-II line of FIG. 1.

As shown in FIG. 2, the liquid crystal television device 100 is provided with the backlight unit 10. The backlight unit 10 (the liquid crystal television device 100) comprises an LED 1, a substrate 2, and a reflective sheet 3. The LED 1 emits light onto the display 101. The dashed arrows in FIG. 2 indicate the light path of the light. The LED 1 is an example of the "light source" of the present disclosure.

The LED 1 is mounted on the substrate 2. Specifically, the LED 1 is fixed relative to a surface (or front surface) 2a of the substrate 2. The LED 1 includes a phosphor 1a (see FIG. 6) and a package 1b (see FIG. 6) that houses the phosphor 1a. In the illustrated embodiment, the phosphor 1a forms a light-emitting region of the LED 1 that emits the light, for example.

Figure 3:
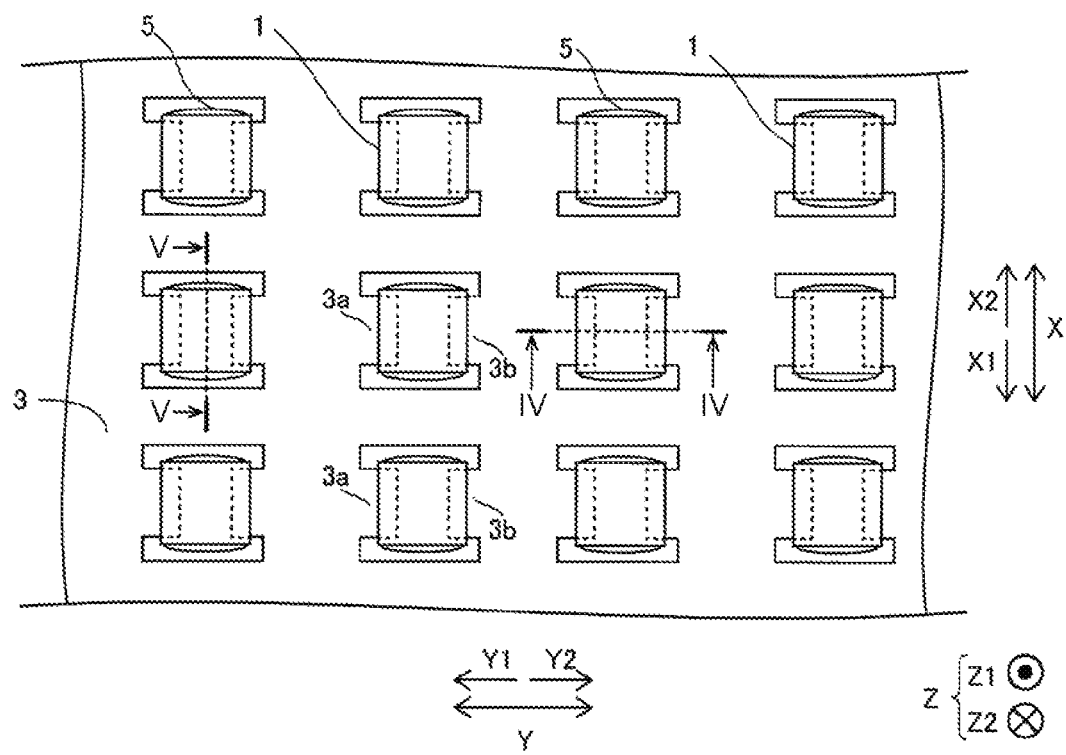
FIG. 3 is a plan view of a reflective sheet and a plurality of LEDs in accordance with the first embodiment.

As shown in FIG. 3, a plurality of LEDs 1 are disposed on the surface 2a of the substrate 2. Specifically, the plurality of LEDs 1 are arranged in a matrix. The LEDs 1 have a rectangular shape as viewed from a perpendicular direction (a Z direction) perpendicular to the surface 2a of the substrate 2 (as viewed from a Z1 direction side). In the illustrated embodiment, the configuration of the backlight unit 10 around each LED 1 is the same with each other, and thus the configuration of the backlight unit 10 around one LED 1 will be described below for the sake of brevity.

As shown in FIG. 2, the reflective sheet 3 is provided to cover the surface 2a of the substrate 2. A double-sided tape (an adhesive tape), which is not shown, is provided between the surface 2a of the substrate 2 and the reflective sheet 3 for fixing the reflective sheet 3 to the surface 2a of the substrate 2. Here, instead of the double-sided tape, an adhesive may be applied between the surface 2a of the substrate 2 and the reflective sheet 3. Thereby, the reflective sheet 3 is adhered to the surface 2a of the substrate 2. The reflective sheet 3 is also configured to expand and contract with heat. In FIG. 2, the reflective sheet 3 is schematically illustrated as if the reflective sheet 3 is floating from the surface 2a of the substrate 2 in order to illustrate the reflective sheet 3 in an easy-to-understand manner. Alternatively, the reflective sheet 3 can merely be placed on the surface 2a of the substrate 2 without being adhered to the surface 2a of the substrate 2.

The backlight unit 10 also includes an optical sheet section 4. The optical sheet section 4 includes a light homogenizing sheet 4a, a diffuser 4b, a prism sheet 4c, a reflective polarization film 4d, and a louver sheet 4e. The light emitted from the LEDs 1 and polarized (adjusted to go straight in a predetermined direction) by passing through the optical sheet section 4 is irradiated onto the display 101. Also, a portion of the light emitted from the LEDs 1 and irradiated on the optical sheet section 4 is reflected on the reflective sheet 3 side. The light reflected by the optical sheet section 4 to the reflective sheet 3 is reflected by the reflective sheet 3 to the optical sheet section 4 side (the display 101 side) (the Z1 direction side). The reflectivity of the reflective sheet 3 is greater than the reflectivity of the surface 2a of the substrate 2 and the reflectivity of soldered portions 5, which will be described later.

Figure 4:
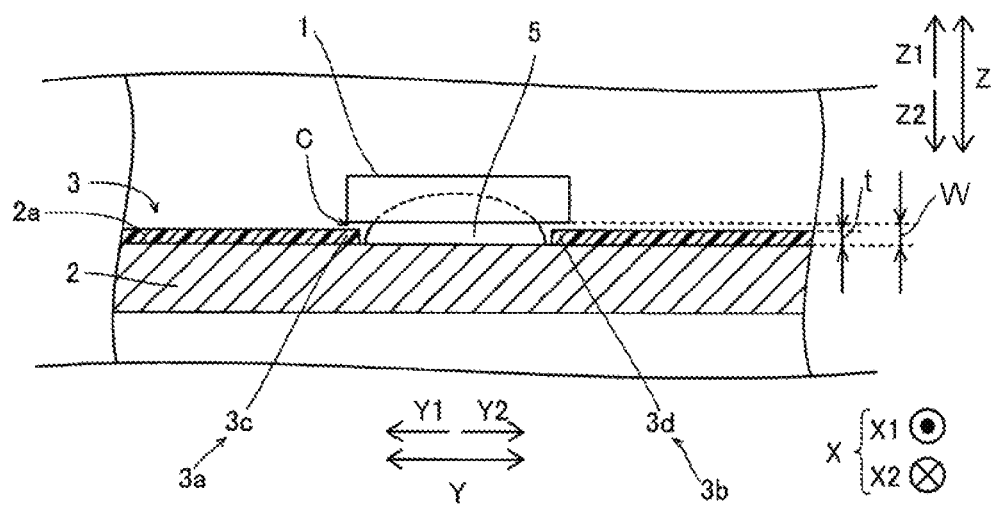
FIG. 4 is a cross-sectional view taken along IV-IV line of FIG. 3.
Figure 5:
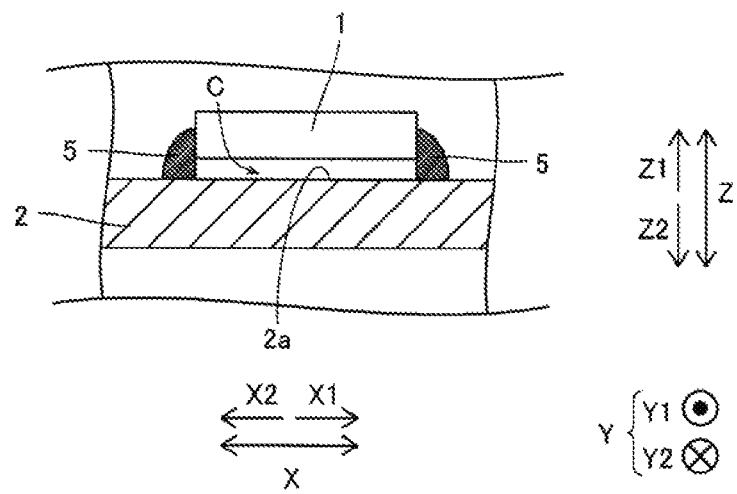
FIG. 5 is a cross-sectional view taken along V-V line of FIG. 3.

As shown in FIGS. 4 and 5, the LED 1 is fixed relative to the surface 2a of the substrate 2 in a state spaced apart from the surface 2a of the substrate 2. Specifically, the LED 1 is fixed relative to the surface 2a of the substrate 2 in a floating state from the surface 2a of the substrate 2 by being supported by the soldered portions 5, which will be described later. This forms a gap C between the LED 1 and the surface 2a of the substrate 2. In FIGS. 4 and 5, for the sake of simplicity, the phosphor 1a is omitted from the illustration. Thus, in the illustrated embodiment, the LED 1 is fixed relative to the surface 2b of the substrate 2 with the gap C therebetween. In particular, as shown in FIG. 5, the LED 1 is fixedly supported by a pair of the soldered portions 5 with the gap C between a bottom surface of the package 1b of the LED 1 and the surface 2a of the substrate 2. As mentioned above, the backlight unit 10 includes multiple LEDs 1, and thus the backlight unit 10 also includes multiple pairs of the soldered portions 5 at locations corresponding to the multiple LEDs 1.

As shown in FIG. 4, the gap C has a width W (e.g., 0.3 mm) in the perpendicular direction (the Z direction). The width W of the gap C is greater than the thickness t (e.g., 0.2 mm) of the reflective sheet 3. In the illustrated embodiment, the gap C extends along an entire length of the LED 1 in the Y direction.

The reflective sheet 3 includes first and second portions 3a and 3b for each LED 1. The first portion 3a extends from one side with respect to the LED 1 in a Y direction (from a Y1 direction side) as viewed from the perpendicular direction (the Z1 direction side), and the second portion 3b extends from the other side with respect to the LED 1 in the Y direction (from a Y2 direction side) as viewed from the perpendicular direction (the Z1 direction side). Here, the Y direction is a direction along the surface 2a of the substrate 2. The Y direction is the short side direction (see FIG. 1) of the liquid crystal television device 100. The Y direction is an example of the "first direction" of the present disclosure. In the illustrated embodiment, the first and second portions 3a and 3b are separated with respect to each other and are arranged with respect to each other in the Y direction. Here, the term "separated," as used herein, encompasses configurations in which adjacent ends of two elements are not directly connected or fixed to each other. Thus, the first and second portions 3a and 3b are separated with respect to each other not only when end portions 3c and 3d (free end portions) of the first and second portions 3a and 3b are spaced apart from each other with a spacing therebetween, but also when the end portions 3c and 3d (free end portions)

of the first and second portions 3a and 3b are in contact with each other or overlap with each other. As mentioned above, the backlight unit 10 includes multiple LEDs 1, and thus the reflective sheet 3 also includes multiple pairs of the first and second portions 3a and 3b at locations corresponding to the multiple LEDs 1. However, the configuration of each pair of the first and second portions 3a and 3b is the same with each other, and thus the configuration of one pair of the first and second portions 3a and 3b will be described below for the sake of brevity.

Here, in the first embodiment, the reflective sheet 3 is provided such that both the first portion 3a and the second portion 3b are inserted into the gap C between the LED 1 and the surface 2a of the substrate 2 as viewed from the perpendicular direction (the Z1 direction side). Specifically, only an end portion 3c (on the LED 1 side) of the first portion 3a of the reflective sheet 3 and an end portion 3d (on the LED 1 side) of the second portion 3b of the reflective sheet 3 are inserted into the gap C.

Figure 6:
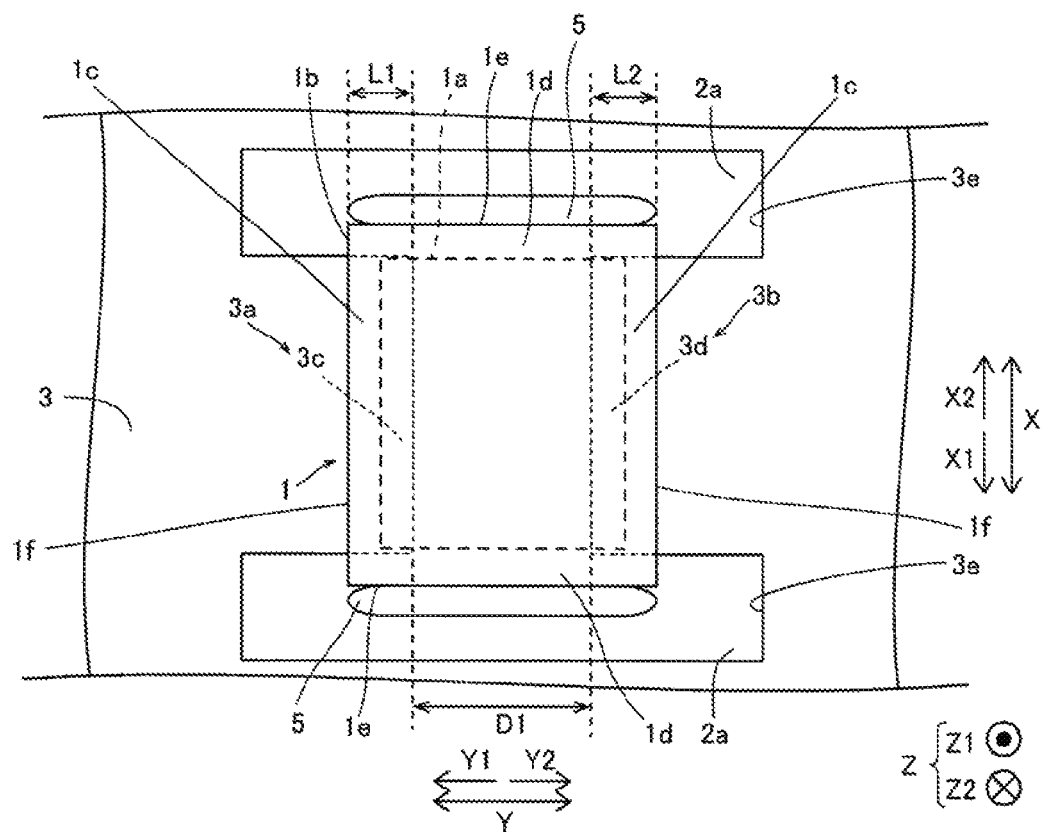
FIG. 6 is an enlarged plan view of the vicinity of an LED in a state in which the reflective sheet is not expanded or contracted in accordance with the first embodiment.

That is, as shown in FIG. 6, as viewed from the perpendicular direction (the Z1 direction side), out of both end portions 1c of the LED 1 (the package 1b) in the Y direction, the end portion 1c on the Y1 direction side overlaps with the first portion 3a (the end portion 3c) of the reflective sheet 3. Also, the end portion 1c on the Y2 direction side of the LED 1 (the package 1b) overlaps with the second portion 3b (the end portion 3d) of the reflective sheet 3. In particular, in the illustrated embodiment, FIG. 6 illustrates the first and second portions 3a and 3b in a state in which the reflective sheet 3 is not expanded or contracted by heat. In the illustrated embodiment, the state in which the reflective sheet 3 is not expanded or contracted by heat (the state of not being expanded or contracted by heat) is also referred to as an original state of the reflective sheet 3. For example, the original state of the reflective sheet 3 (the original state of the first and second portions 3a and 3b) can indicate a state of the reflective sheet 3 when the reflective sheet 3 is in a room temperature (a normal room temperature) or when the liquid crystal television device 100 (the backlight unit 10) is in a non-operating state. Furthermore, in this original state, as shown in FIG. 6, the end portions 3c and 3d of the first and second portions 3a and 3b also overlap with the phosphor 1a as viewed from the perpendicular direction. However, the end portions 3c and 3d of the first and second portions 3a and 3b can also be configured not to overlap with the phosphor 1a as viewed from the perpendicular direction as long as the end portions 3c and 3d overlap with the end portions 1c of the package 1b of the LED 1, respectively.

Here, the reflective sheet 3 is configured to be inserted into the gap C between the LED 1 and the surface 2a of the substrate 2, thereby contact between the reflective sheet 3 expanded by heat and the LED 1 can be avoided even if there are variations in manufacturing (e.g., variations in the mounting of the LED 1, variations in the mounting position of the substrate 2, etc.).

In the first embodiment, as shown in FIG. 6, the length L1 (e.g., 0.4 mm) of an overlapping portion between the first portion 3a of the reflective sheet 3 in a state of not being expanded or contracted by heat and the LED 1 in the Y direction and the length L2 (e.g., 0.4 mm) of an overlapping portion between the second portion 3b of the reflective sheet 3 in a state of not being expanded or contracted by heat and the LED 1 in the Y direction as viewed from the perpendicular direction are each greater than the amount of contraction (length of contraction) of the reflective sheet 3 by heat (e.g., 0.2 mm).

Figure 7:
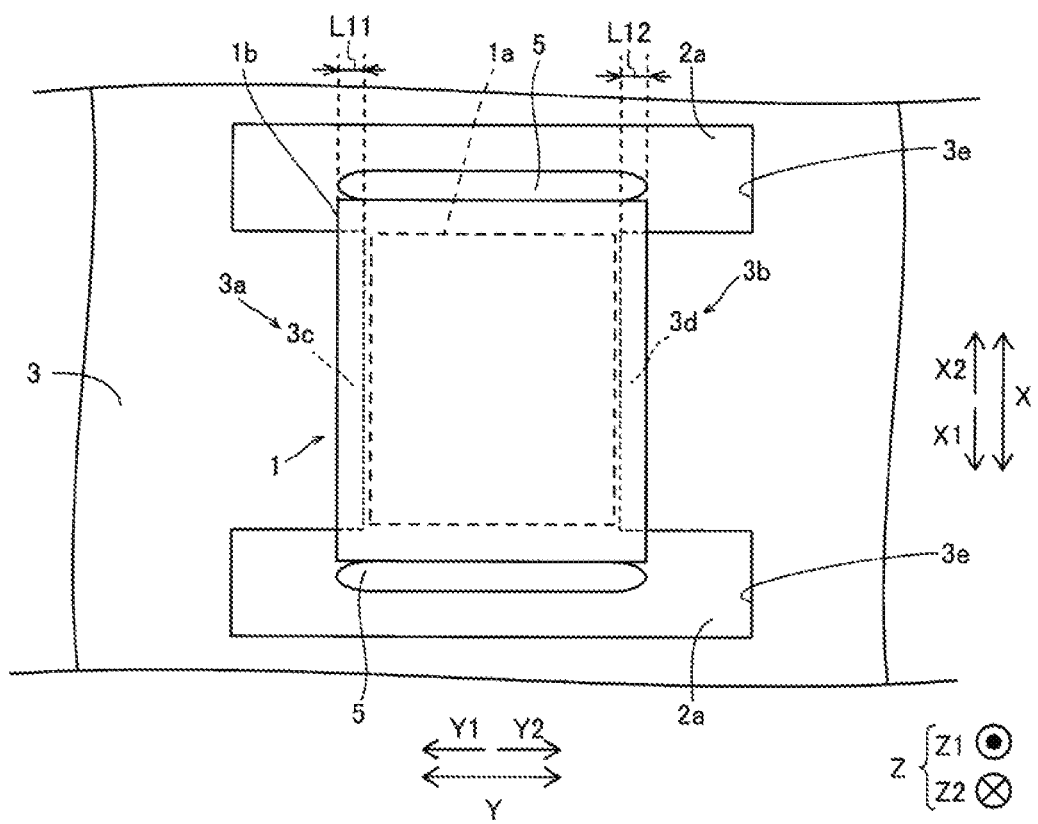
FIG. 7 is an enlarged plan view of the vicinity of the LED in a state in which the reflective sheet is contracted in accordance with the first embodiment.

That is, as shown in FIG. 7, the reflective sheet 3 is provided such that the first portion 3a and the LED 1 overlap with each other even in a contracted state due to heat (low temperature) as viewed from the perpendicular direction. The length L11 of a portion where the first portion 3a of the reflective sheet 3 in the contracted state due to heat and the LED 1 overlap with each other is 0.2 mm, for example. Also, the reflective sheet 3 is provided such that the second portion 3b and the LED 1 overlap with each other even in the contracted state due to heat (low temperature). The length L12 of a portion where the second portion 3b of the reflective sheet 3 in the contracted state due to heat and the LED 1 overlap with each other is 0.2 mm, for example. Thus, in the illustrated embodiment, even if the reflective sheet 3 is contracted due to heat (due to low temperature (e.g., lower temperature than normal room temperature)) by the amount of contraction (e.g., 0.2 mm at each of the first and second portions 3a and 3b) with respect to the original state of the reflective sheet 3 (shown in FIG. 6), the first and second portions 3a and 3b of the reflective sheet 3 still overlap with the LED 1 by the lengths L11 and L12 (e.g., 0.2 mm). In the illustrated embodiment, the state in which the reflective sheet 3 is contracted by heat (the state of being contracted by heat) is also referred to as the contracted state due to heat. This contracted state of the reflective sheet 3 can indicate a state of the reflective sheet 3 when the reflective sheet 3 is in a low temperature, such as the minimum (lowest) temperature of a predetermined temperature range (e.g., the guaranteed operating temperature range of the liquid crystal television device 100). Furthermore, the contracted state of the reflective sheet 3 can also indicate a state of the reflective sheet 3 when the reflective sheet 3 is in the above-mentioned low temperature while the liquid crystal television device 100 is in a non-operating state or in an operating state, for example. Furthermore, the contracted state of the reflective sheet 3 can also indicate a state of the reflective sheet 3 when the reflective sheet 3 is in a lower temperature than a predetermined temperature, for example. Thus, the above-mentioned amount of contraction (length of contraction) of the reflective sheet 3 by heat can be achieved when the reflective sheet 3 is in the above-mentioned contracted state.

In the first embodiment, as shown in FIG. 6, the first portion 3a of the reflective sheet 3 and the second portion 3b of the reflective sheet 3 are spaced apart from each other. Specifically, the end portion 3c of the first portion 3a of the reflective sheet 3 in a state of not being expanded or contracted by heat and the end portion 3d of the second portion 3b of the reflective sheet 3 in the state of not being expanded or contracted by heat are spaced apart from each other in the Y direction by a distance D1 (e.g., 1 mm).

Figure 8:
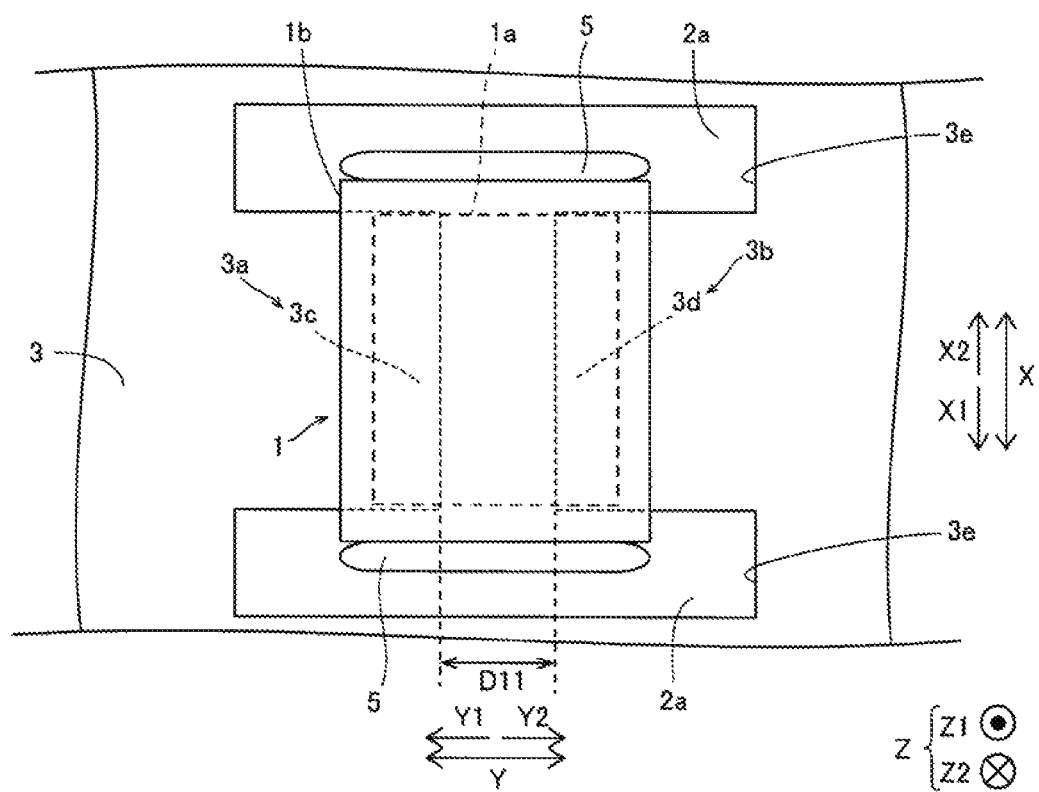
FIG. 8 is an enlarged plan view of the vicinity of the LED in a state in which the reflective sheet is expanded in accordance with the first embodiment.

As shown in FIG. 8, the end portions 3c of the first portion 3a of the reflective sheet 3 in a state of being expanded by heat (due to high temperature (e.g., higher temperature than normal room temperature or high temperature due to the liquid crystal television device being in an operating state)) and the end portion 3d of the second portion 3b of the reflective sheet 3 in the state of being expanded by heat (high temperature) are spaced apart from each other in the Y direction by a distance D11 (e.g., 0.6 mm). Thus, in the illustrated embodiment, even if the reflective sheet 3 is expanded due to heat (due to high temperature) by the amount of expansion (e.g., 0.2 mm at each of the first and second portions 3a and 3b) with respect to the original state of the reflective sheet 3 (shown in FIG. 6), the end portions 3c and 3d of the first and second portions 3a and 3b of the reflective sheet 3 are still spaced apart from each other by the distance D11 (e.g., 0.6 mm). In the illustrated embodiment, the state in which the reflective sheet 3 is expanded by heat (the state of being expanded by heat) is also referred to as the expanded state due to heat. This expanded state of the reflective sheet 3 can indicate a state of the reflective sheet 3 when the reflective sheet 3 is in a high temperature, such as the maximum (highest) temperature of the predetermined temperature range (e.g., the guaranteed operating temperature range of the liquid crystal television device 100). Furthermore, the expanded state of the reflective sheet 3 can also indicate a state of the reflective sheet 3 when the reflective sheet 3 is in the above-mentioned high temperature while the liquid crystal television device 100 is in a non-operating state or in an operating state, for example. Furthermore, the expanded state of the reflective sheet 3 can also indicate a state of the reflective sheet 3 when the reflective sheet 3 is in a higher temperature than a predetermined temperature, for example.

In the first embodiment, the reflective sheet 3 is configured such that the amount of expansion and contraction (the length of expansion and contraction) due to heat in the Y direction, in which each of the first portion 3a and the second portion 3b extends, is greater than the amount of expansion and contraction (the length of expansion and contraction) due to heat in an X direction that is orthogonal to the Y direction. Thus, the reflective sheet 3 is configured such that a thermal expansion amount of the reflective sheet 3 in the Y direction is greater than a thermal expansion amount of the reflective sheet 3 in the X direction. Here, the X direction is the long side direction (see FIG. 1) in the liquid crystal television device 100. The X direction is a direction along the surface 2a of the substrate 2. The X direction is an example of the "second direction" of the present disclosure. Here, the thermal expansion amount or thermal expansion of a material refers to the change amount of the length of the material in response to a change in temperature, and usually becomes larger (expansion) with increasing temperature. Thus, in the illustrated embodiment, the reflective sheet 3 expands in the Y direction more than in the X direction with increasing temperature, while the reflective sheet 3 contracts in the Y direction more than in the X direction with decreasing temperature, for example. Thus, in the illustrated embodiment, the reflective sheet 3 is made of a material with a positive thermal expansion. Furthermore, the reflective sheet 3 can also be made of a material with a positive thermal expansion at least within a range of a predetermined operating temperature of the liquid crystal television device 100. However, the reflective sheet 3 can be made of a material with a negative thermal expansion or thermal contraction with which the material contracts on heating.

As shown in FIGS. 6 to 8, each of the first portion 3a of the reflective sheet 3 and the second portion 3b of the reflective sheet 3 is provided to extend from the vicinity of an end portion 1d (see FIG. 6) on one side of the LED 1 in the X direction to the vicinity of an end portion 1d (see FIG. 6) on the other side of the LED 1 in the X direction. The backlight unit 10 has the soldered portions 5 that fix the LED 1 to the surface 2a of the substrate 2. The reflective sheet 3 includes a pair of openings 3e that expose the soldered portions 5, respectively. In the openings 3e, the surface 2a of the substrate 2 is exposed. As mentioned above, the backlight unit 10 includes multiple LEDs 1, and thus the reflective sheet 3 includes multiple pairs of the openings 3e at locations corresponding to the multiple LEDs 1.

Here, in the first embodiment, the soldered portions 5 are provided to bond both end portions 1d (see FIG. 6) of the LED 1 in the X direction with the surface 2a of the substrate 2. Specifically, the soldered portions 5 are provided to extend along a pair of edges 1e of the LED 1 (see FIG. 6), respectively, that extend along the Y direction as viewed from the perpendicular direction (the Z1 direction side). Here, in the illustrated embodiment, the soldered portions 5 are not provided along a pair of sides 1f of the LED 1 (see FIG. 6) extending along the X direction as viewed from the perpendicular direction.

The soldered portions 5 are provided to be displaced from each of the first portion 3a of the reflective sheet 3 and the second portion 3b of the reflective sheet 3 in the X direction. Thus, contact between the soldered portion 5 and each of the first portion 3a of the reflective sheet 3 and the second portion 3b of the reflective sheet 3 can be suppressed even when each of the first portion 3a of the reflective sheet 3 and the second portion 3b of the reflective sheet 3 is expanded by heat.

In the first embodiment, the openings 3e of the reflective sheet 3 are provided to extend along the edges 1e of the LED 1, respectively, as viewed from the perpendicular direction (the Z1 direction side). Specifically, the openings 3e of the reflective sheet 3 are provided to surround the soldered portions 5 and both end portions 1d of the LED 1 in the X direction as viewed from the perpendicular direction.

The first portion 3a of the reflective sheet 3 and the second portion 3b of the reflective sheet 3 are sandwiched between the openings 3e of the reflective sheet 3 corresponding to the edges 1e of the LED 1, respectively. In the illustrated embodiment, the openings 3e have an overall rectangular shape and surround the soldered portions 5, respectively, as viewed in the perpendicular direction. However, the openings 3e can have a different shape as long as the soldered portions 5 can extend through the openings 3e to bond the LED 1 to the surface 2a of the substrate 2 through the openings 3e. In the illustrated embodiment, the reflective sheet 3 includes the pair of openings 3e for each LED 1. In the illustrated embodiment, as shown in FIGS. 6 to 8, the openings 3a are connected to each other via a spacing between the first and second portions 3a and 3b to form a single opening for each LED 1. Specifically, this single opening of the reflective sheet 3 has a pair of wide sections formed by the openings 3e, and a narrow section formed by the spacing between the first and second portions 3a and 3b. This narrow section (the spacing between the first and second portions 3a and 3b) is disposed between the wide sections (the openings 3e) in the X direction and is narrower in the Y direction than the wide sections. The first and second portions 3a and 3b form opposite edge portions of this narrow section of the single opening that are opposite to each other in the Y direction. In the illustrated embodiment, the reflective sheet is formed as a one-piece, unitary member. Thus, the first and second portions 3a and 3b are formed by cutting out or removing the single opening from a sheet material for the reflective sheet 3. However, the first and second portions 3a and 3b can also be formed as separate members that are attached to the sheet material for the reflective sheet 3. Also, in the illustrated embodiment, as shown in FIG. 6, the first and second portions 3a and 3b have the length in the X direction that are shorter than the length of the gap C in the X direction or the length between the soldered portions 5. More specifically, in the illustrated embodiment, the lengths of the first and second portions 3a and 3b in the X direction are substantially the same as or slightly greater than the length of the phosphor 1a in the X direction that defines the light-emitting region of the LED 1, but smaller than the length of the package 1b in the X direction.

Experimental Results

Compared to a configuration (comparative example) in which an opening that is a size larger than the LED 1 as viewed from the perpendicular direction (the Z1 direction side) and in which the entirety of the LED 1 is disposed (housed) (an opening so large that the reflective sheet does not come into contact with LED1 even when the reflective sheet expands due to heat) is provided to the reflective sheet, the experimental results show that the reflection efficiency of the light in the backlight unit 10 (the liquid crystal television device 100) is improved by 2-10% when the backlight unit 10 is configured as described above.

Effect of the First Embodiment

In the first embodiment, the following effects can be achieved.

In the first embodiment, as described above, the backlight unit 10 is configured such that both the first portion 3a and the second portion 3b of the reflective sheet 3 are inserted into the gap C between the LED 1 and the surface 2a of the substrate 2 as viewed from the perpendicular direction. Thus, the formation of an area where the surface 2a of the substrate 2 is exposed between the reflective sheet 3 and the LED 1 as viewed from the perpendicular direction can be suppressed. As a result, a decrease in the reflection efficiency of the light in the backlight unit 10 can be suppressed.

In the first embodiment, as described above, the backlight unit 10 (the liquid crystal television device 100) is configured such that the amount of expansion and contraction by heat in the Y direction, in which each of the first portion 3a and the second portion 3b of the reflective sheet 3 extends, is greater than the amount of expansion and contraction by heat in the X direction. Thus, the amount of expansion and contraction by heat of each of the first portion 3a of the reflective sheet 3 and the second portion 3b of the reflective sheet 3 in the Y direction is relatively large, and thus it is particularly effective in suppressing contact between the LED 1 and the reflective sheet 3 that at least one of the first portion 3a of the reflective sheet 3 and the second portion 3b of the reflective sheet 3 is inserted into the gap C between the surface 2a of the substrate 2 and the LED 1.

In the first embodiment, as described above, the backlight unit 10 is configured such that the length L1 of the overlapping portion between the first portion 3a of the reflective sheet 3 in a state of not being expanded or contracted by heat and the LED 1 in the Y direction and the length L2 of the overlapping portion between the second portion 3b of the reflective sheet 3 in the state of not being expanded or contracted by heat and the LED 1 in the Y direction and as viewed from the perpendicular direction are each greater than the amount by which the reflective sheet 3 contracts by heat. Thus, each of the first portion 3a of the reflective sheet 3 and the second portion 3b of the reflective sheet can be suppressed from exiting the gap C between the LED 1 and the surface 2a of the substrate 2 even when the reflective sheet 3 is contracted due to low temperature heat. As a result, the area of the surface 2a of the substrate 2 to be exposed can be suppressed from becoming large.

In the first embodiment, as described above, the backlight unit 10 is configured such that the first portion 3a of the reflective sheet 3 and the second portion 3b of the reflective sheet 3 are provided to be spaced apart from each other. Thus, compared to the case where the first portion 3a of the reflective sheet 3 and the second portion 3b of the reflective sheet 3 are in contact with each other, the length of at least one of the first portion 3a of the reflective sheet 3 and the second portion 3b of the reflective sheet 3 that are inserted into the gap C between the LED 1 and the surface 2a of the substrate 2 can be shortened. As a result, the work of inserting at least one of the first portion 3a of the reflective sheet 3 and the second portion 3b of the reflective sheet 3 into the gap C between the LED 1 and the surface 2a of the substrate 2 can be made easier.

In the first embodiment, as described above, the backlight unit 10 is configured such that the soldered portions 5 bond both end portions 1d of the LED 1 in the X direction to the surface 2a of the substrate 2. Thus, it can be suppressed that the insertion of the first portion 3a and the second portion 3b extending along the Y direction into the gap C between the LED 1 and the surface 2a of the substrate 2 is interfered by the soldered portions 5.

In the first embodiment, as described above, the backlight unit 10 is configured such that the openings 3e of the reflective sheet 3 extend along the pair of edges 1e of the LED 1 extending along the Y direction as viewed from the perpendicular direction. Thus, the soldered portions 5 can be provided along the Y direction in the openings 3e of the reflective sheet 3, respectively. As a result, the contact area between each of the LED 1 and the surface 2a of the substrate 2 and the soldered portions 5 can be easily increased. Thus, the LED 1 can be more stably fixed to the surface 2a of the substrate 2.

In the first embodiment, as described above, the liquid crystal television device 100 is configured such that both the first portion 3a and the second portion 3b of the reflective sheet 3 are inserted into the gap C between the LED 1 and the surface 2a of the substrate 2 as viewed from the perpendicular direction. Thus, the formation of an area where the surface 2a of the substrate 2 is exposed between the reflective sheet 3 and the LED 1 as viewed from the perpendicular direction can be suppressed. As a result, a decrease in the reflection efficiency of the light in the liquid crystal television device 100 can be suppressed.

Second Embodiment

Referring now to FIGS. 9 to 14, the configuration of a backlight unit 20 and a liquid crystal television device 200 according to a second embodiment will be described. In view of the similarity between the first and second embodiments, the parts of the second embodiment that are identical to or similar to the parts of the first embodiment will be given the same reference numerals as the parts of the first embodiment. Moreover, the descriptions of the parts of the second embodiment that are identical to or similar to the parts of the first embodiment may be omitted for the sake of brevity. In the second embodiment, unlike the first embodiment, out of a first portion 13a of a reflective sheet 13 and a second portion 13b of the reflective sheet 13, only the first portion 13a is inserted into the gap C between the surface 2a of the substrate 2 and the LED 1. Here, the backlight unit 20 and the liquid crystal television device 200 are examples of the "lighting device" and the "display device" of the present disclosure, respectively.

Figure 9:
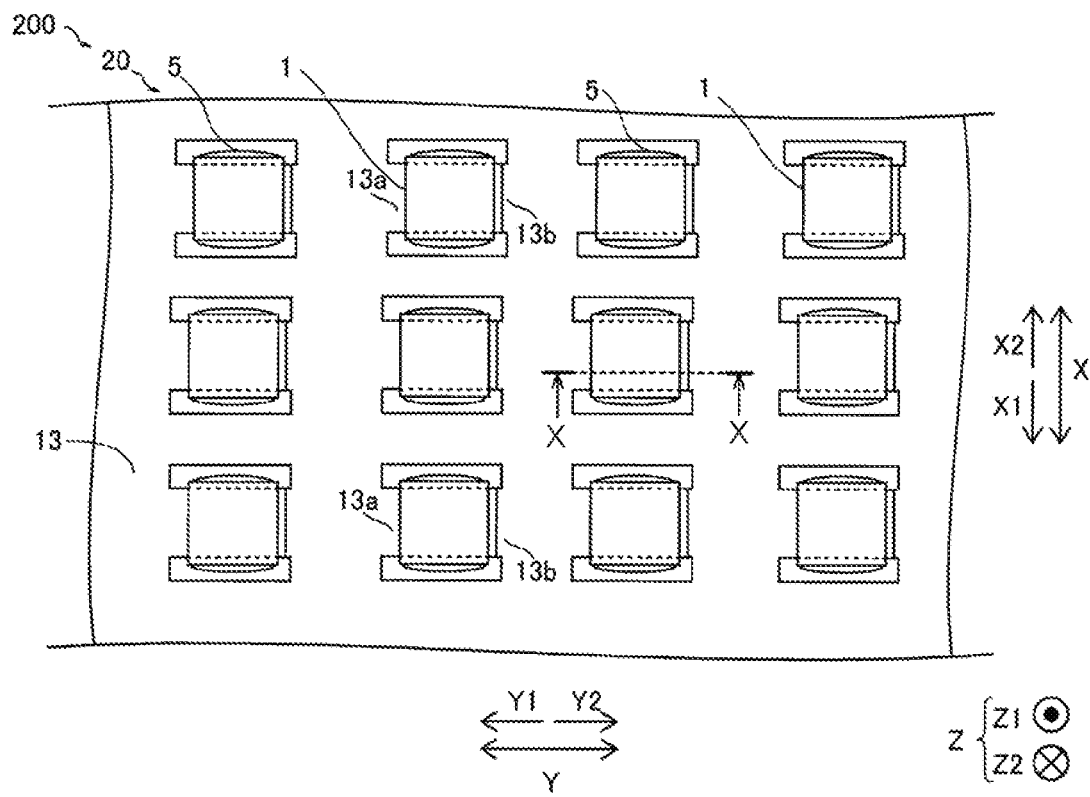
FIG. 9 is a plan view of a reflective sheet and a plurality of LEDs in accordance with a second embodiment.

As shown in FIG. 9, the liquid crystal television device 200 (the backlight unit 20) is equipped with the reflective sheet 13.

Figure 10:
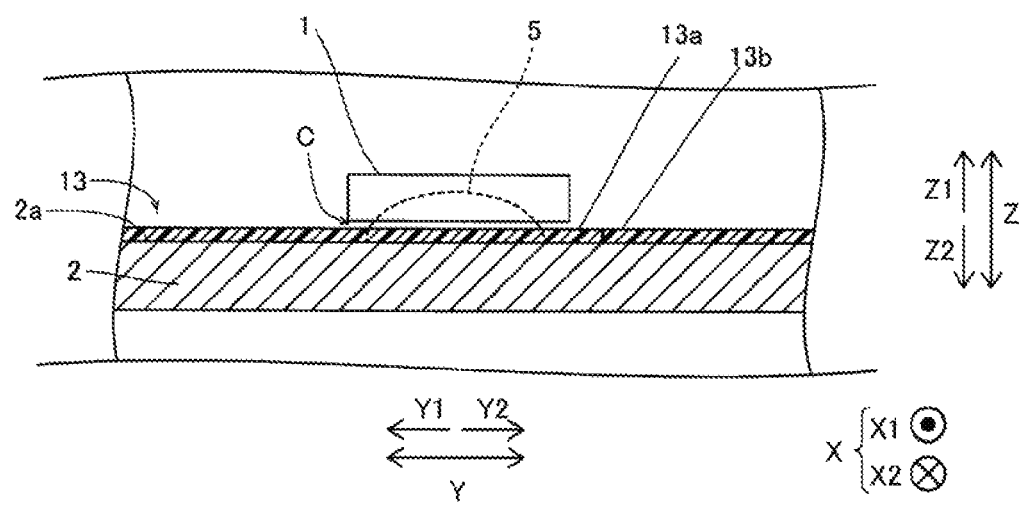
FIG. 10 is a cross-sectional view taken along X-X line of FIG. 9.

As shown in FIG. 10, the first portion 13a of the reflective sheet 13 is provided to extend through (penetrate through) the gap C between the LED 1 and the surface 2a of the substrate 2 to the vicinity of the second portion 13b of the reflective sheet 13 provided outside of the LED 1. Here, the second portion 13b of the reflective sheet 13 is not inserted into the gap C between the LED 1 and the surface 2a of the substrate 2. Also, the phrase "provided outside of LED 1" means that it does not overlap with the LED 1 as viewed from the perpendicular direction (the Z1 direction side). Similar to the first embodiment, the backlight unit 20 includes multiple LEDs 1, and thus the reflective sheet 13 also includes multiple pairs of the first and second portions 13a and 13b for multiple LEDs at locations corresponding to the multiple LEDs 1. However, the configuration of each pair of the first and second portions 13a and 13b is the same with each other, and thus the configuration of one pair of the first and second portions 13a and 13b will be described below for the sake of brevity.

Figure 11:
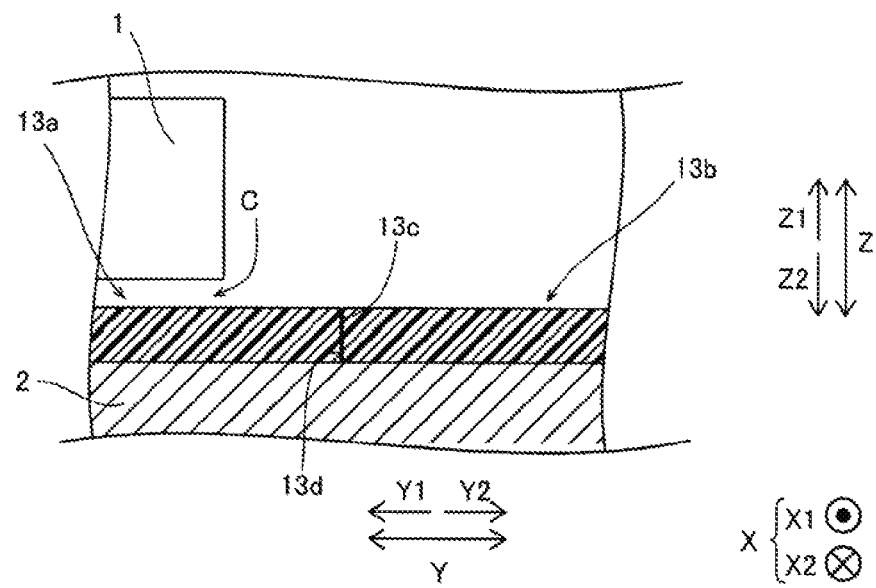
FIG. 11 is a partial enlarged cross-sectional view of the vicinity of each of end faces of first and second portions in a state in which a reflective sheet is not expanded or contracted in accordance with the second embodiment.

Here, in the second embodiment, as shown in FIG. 11, the first portion 13a of the reflective sheet 13 in a state (an original state) of not being expanded or contracted by heat and the second portion 13b of the reflective sheet 13 in the state (the original state) of not being expanded or contracted by heat are provided such that end surfaces (13c, 13d) thereof are disposed opposite relative to each other without overlapping with each other. Specifically, when the reflective sheet 13 is not expanded or contracted by heat, the end surface 13c of the first portion 13a of the reflective sheet 13 and the end surface 13d of the second portion 13b of the reflective sheet 13 are in contact with each other. Furthermore, in the illustrated embodiment, when the reflective sheet 13 is not expanded or contracted by heat, the end surfaces 13c and 13d of the first and second portions 13a and 13b of the reflective sheet 13 do not overlap with each other as viewed from the perpendicular direction. Also, in the illustrated embodiment, when the reflective sheet 13 is not expanded or contracted by heat, the end surface 13c of the first portion 13a is flush with the end surface 13d of the second portion, as shown in FIG. 11. Here, FIG. 11 shows an example where the end surface 13c and the end surface 13d are in contact with each other as described above, but the end surface 13c and the end surface 13d may be slightly spaced apart from each other.

Figure 12:
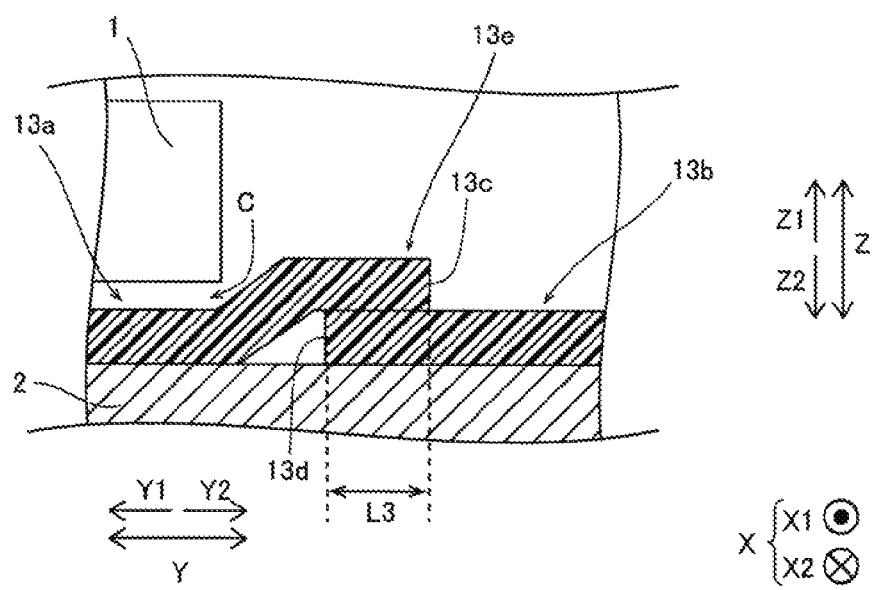
FIG. 12 is a partial enlarged cross-sectional view of the vicinity of each of the end faces of the first and second portions in a state in which the reflective sheet is expanded in accordance with the second embodiment.

As shown in FIG. 12, the first portion 13a of the reflective sheet 13 and the second portion 13b of the reflective sheet 13 are arranged to be capable of overlapping with each other by being expanded by heat (e.g., due to high temperature). Specifically, the first portion 13a of the reflective sheet 13 and the second portion 13b of the reflective sheet 13 are expanded by heat to overlap with each other, thereby forming an overlapping portion 13e between the first portion 13a and the second portion 13b. The overlapping portion 13e has a length L3 (e.g., 0.5 mm) in the Y direction. The length L3 of the overlapping portion 13e is a length corresponding to the sum of the amount (the length) by which each of the first portion 13a of the reflective sheet 13 and the second portion 13b of the reflective sheet 13 is expanded by heat. Here, FIG. 12 illustrates a state in which the first portion 13a of the reflective sheet 13 overlaps with an upper portion of the second portion 13b of the reflective sheet 13, but the second portion 13b of the reflective sheet 13 may overlap with an upper portion of the first portion 13a of the reflective sheet 13.

Figure 13:
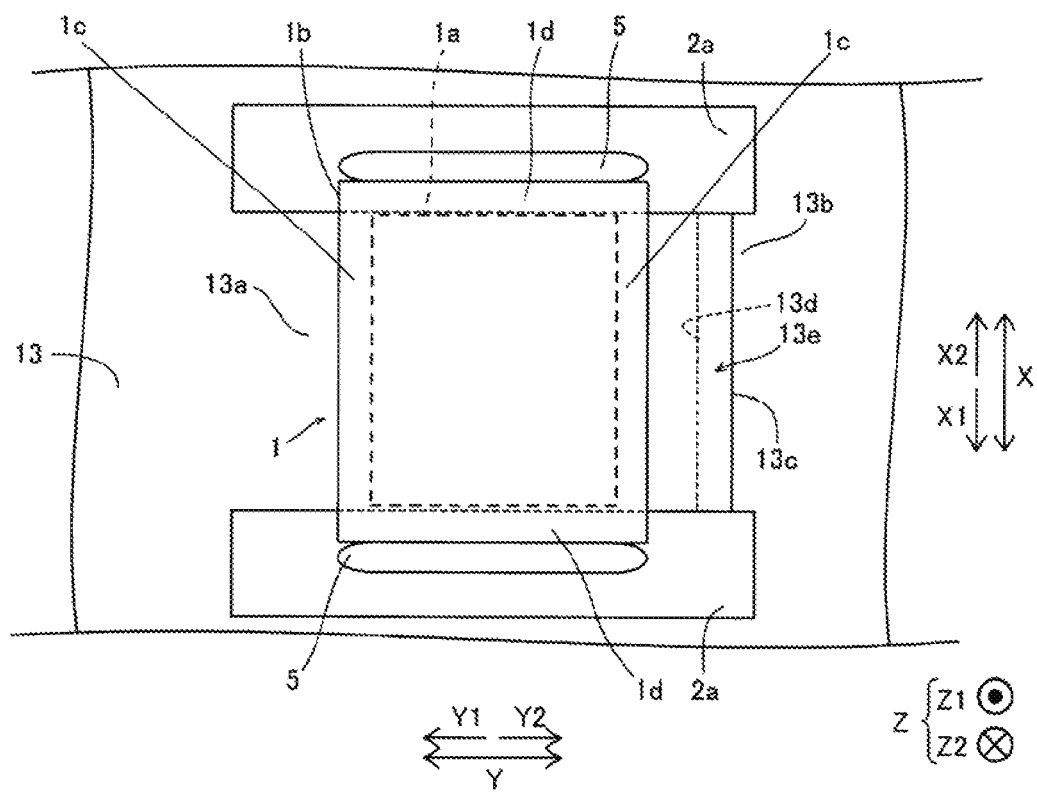
FIG. 13 is an enlarged plan view of the vicinity of an LED in a state in which the reflective sheet is expanded in accordance with the second embodiment.

As shown in FIG. 13, the overlapping portion 13e is provided to extend from the vicinity of the end portion 1d of the LED 1 on one side in the X direction to the vicinity of the end portion 1d of the LED 1 on the other side in the X direction. In the illustrated embodiment, as shown in FIGS. 12 and 13, when the reflective sheet 13 is expanded by heat, the first portion 13a and the second portion 13b overlap with respect to each other at a location outside of the LED 1 as viewed from the perpendicular direction (from the Z direction). Thus, in the illustrated embodiment, the overlapping portion 13e is entirely located outside of the LED 1 (the package 1b), as shown in FIG. 13.

Figure 14:
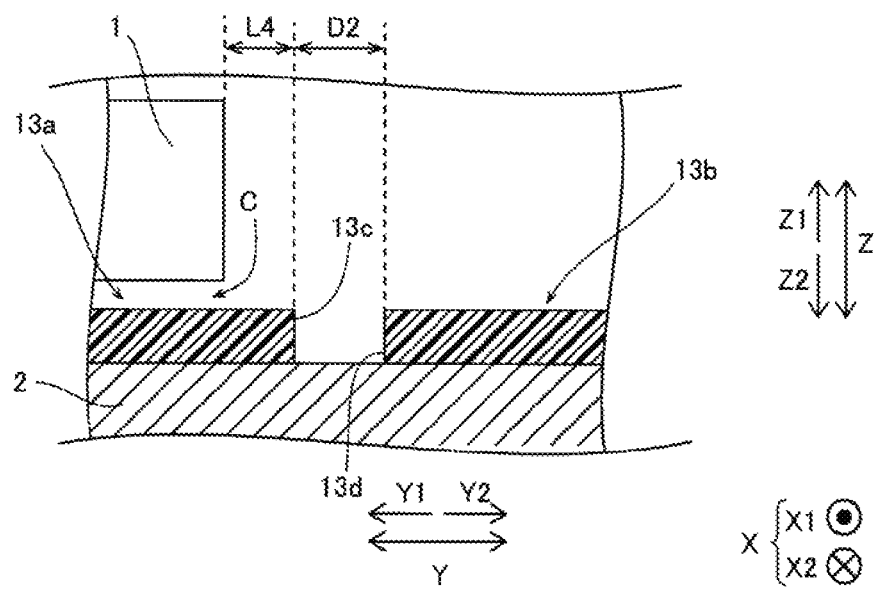
FIG. 14 is a partial enlarged cross-sectional view of the vicinity of each of the end faces of the first and second portions in a state in which the reflective sheet is contracted in accordance with the second embodiment.

As shown in FIG. 14, the first portion 13a of the reflective sheet 13 and the second portion 13b of the reflective sheet 13 are spaced apart from each other in the Y direction by a distance D2 when the reflective sheet 13 is contracted by heat (e.g., due to low temperature). In the illustrated embodiment, the first portion 13a of the reflective sheet 13 protrudes by a length L4 in the Y2 direction side from the LED 1 even when the reflective sheet 13 is contracted by heat. In the illustrated embodiment, as shown in FIG. 13, similarly to the openings 3e of the first embodiment, the reflective sheet 13 also includes a pair of openings at locations corresponding to the soldered portions 5. Thus, as shown in FIG. 13, the surface 2a of the substrate 2 is exposed through the openings of the reflective sheet 13 about the soldered portions 5, respectively. Specifically, the openings of the reflective sheet 13 are separated with respect to each other in the X direction as viewed from the perpendicular direction when the reflective sheet 13 is in the original state shown in FIGS. 10 and 11 and in the expanded state shown in FIGS. 12 and 13. In particular, as the end surfaces 13c and 13d of the first and second portions 13a and 13b are in contact with each other in the original state and overlap with each other in the expanded state, the openings of the reflective sheet 13 are separated from each other in the X direction by the first and second portions 13a of the reflective sheet 13. On the other hand, when the reflective sheet 13 is in the contracted state shown in FIG. 14, the end surfaces 13c and 13d of the first and second portions 13a and 13b are spaced apart from each other in the Y direction to form a spacing therebetween. Thus, the openings of the reflective sheet 13 are connected to each other via the spacing between the end surfaces 13c and 13d of the first and second portions 13a and 13b.

The other configurations of the second embodiment are the same as the first embodiment above.

Effect of the Second Embodiment

In the second embodiment, as described above, the backlight unit 20 is configured such that the first portion 13a of the reflective sheet 13 extends through the gap C between the LED 1 and the surface 2a of the substrate 2 to the vicinity of the second portion 13b of the reflective sheet 13 that is provided outside of the LED 1 as viewed from the perpendicular direction. Thus, compared to the case where the reflective sheet 13 is not provided between the second portion 13b of the reflective sheet 13 and the LED 1, as the first portion 13a of the reflective sheet 13 extends to the vicinity of the second portion 13b of the reflective sheet 13 (between the second portion 13b of the reflective sheet 13 and the LED 1), the area of the surface 2a of the substrate 2 to be exposed can be made relatively small. As a result, it is possible to suppress a decrease in the reflection efficiency of the light in the backlight unit 20.

In the second embodiment, as described above, the backlight unit 20 is configured such that each of the first portion 13a of the reflective sheet 13 and the second portion 13b of the reflective sheet 13 is arranged to be capable of overlapping with each other by being expanded by heat. Thus, when each of the first portion 13a of the reflective sheet 13 and the second portion 13b of the reflective sheet 13 is expanded by heat, the formation of an area where the surface 2a of the substrate 2 is exposed between the first portion 13a of the reflective sheet 13 and the second portion 13b of the reflective sheet 13 can be easily suppressed.

In the second embodiment, as described above, the first portion 13a of the reflective sheet 13 in a state of not being expanded or contracted by heat and the second portion 13b of the reflective sheet 13 in a state of not being expanded or contracted by heat are provided such that the end surfaces 13c and 13d are disposed opposite relative to each other without overlapping with each other. Thus, the first portion 13a of the reflective sheet 13 in the state of not being expanded or contracted by heat and the second portion 13b of the reflective sheet 13 in the state of not being expanded or contracted by heat are disposed opposite relative to each other, thereby the first portion 13a and the second portion 13b can easily overlap with each other when the reflective sheet 13 is expanded by heat, while suppressing the first portion 13a and the second portion 13b from overlapping with each other at room temperature.

In the second embodiment, as described above, the liquid crystal television device 200 is configured such that the first portion 13a of the reflective sheet 13 extends through the gap C between the LED 1 and the surface 2a of the substrate 2 to the vicinity of the second portion 13b of the reflective sheet 13 that is provided outside of the LED 1. Thus, compared to the case where the reflective sheet 13 is not provided between the second portion 13b of the reflective sheet 13 and the LED 1, as the first portion 13a of the reflective sheet 13 extends to the vicinity of the second portion 13b of the reflective sheet 13 (between the second portion 13b of the reflective sheet 13 and the LED 1), the area of the surface 2a of the substrate 2 to be exposed can be made relatively small. As a result, it is possible to suppress a decrease in the reflection efficiency of the light in the liquid crystal television device 200.

The other effects of the second embodiment are the same as in the first embodiment.

Modification Examples

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first and second embodiments above, an example is shown in which the first and second portions 3a and 3b (13a and 13b) of the reflective sheet 3 (13) extends in the Y direction, however, the present invention is not limited to this. For example, the first and second portions 3a and 3b (13a and 13b) of the reflective sheet 3 (13) may extend in the X direction. Specifically, when the gap C between the LED 1 and the surface 2a of the substrate extends from one side of the LED 1 to the other side of the LED 1 in the X direction, the first and second portions 3a and 3b (13a and 13b) of the reflective sheet 3 (13) can be configured to extend through the gap C in the X direction.

In the first embodiment above, an example is shown in which the first and second portions 3a and 3b of the reflective sheet 3 are spaced apart from each other, however, the present invention is not limited to this. For example, the first and second portions 3a and 3b of the reflective sheet 3 may be in contact with each other (overlapping with each other). Specifically, in this case, the first and second portions 3a and 3b of the reflective sheet 3 can each extend to the vicinity of the center of the LED 1 in the Y direction. Furthermore, in the first embodiment above, the first and second portions 3a and 3b have the same length in the Y direction. However, the first and second portions 3a and 3b can have different lengths in the Y direction, respectively. In this case, the longer one of the first and second portions 3a and 3b can also be configured to extend beyond the center of the LED 1 in the Y direction to overlap with the center of the LED 1 as viewed in the perpendicular direction.

In the second embodiment above, an example is shown in which the first and second portions 13a and 13b of the reflective sheet 13 overlap with each other when the reflective sheet 13 is expanded by heat, however, the invention is not limited to this. For example, when the reflective sheet 13 is expanded by heat, the first and second portions 13a and 13b of the reflective sheet 13 may be in contact with each other without overlapping with each other.

In the second embodiment above, an example is shown in which the first and second portions 13a and 13b of the reflective sheet 13 do not overlap with each other when the reflective sheet 13 is not expanded or contracted by heat, however, the present invention is not limited to this. When the reflective sheet 13 is not expanded or contracted by heat, the first and second portions 13a and 13b of the reflective sheet 13 may overlap with each other. In this case, the first and second portions 13a and 13b of the reflective sheet 13 may be in contact with each other or overlap with each other, even when the reflective sheet 13 is contracted by heat.

In the second embodiment above, an example is shown in which the first portion 13a of the reflective sheet 13 is inserted into the gap C between the LED 1 (light source) and the surface 2a of the substrate 2, and the second portion 13b of the reflective sheet 13 is not inserted into the gap C, however, the present invention is not limited to this. Without the first portion 13a of the reflective sheet 13 being inserted into the gap C, the second portion 13b of the reflective sheet 13 may be inserted into the gap C.

In the first and second embodiments above, an example is shown in which the soldered portions 5 are not provided along the pair of the edges 1f of the LED 1 extending along the X direction as viewed from the perpendicular direction, however, the present invention is not limited to this. For example, the soldered portions 5 may be provided along the pair of the edges if extending along the X direction as long as the insertion of the reflective sheet 3 (13) into the gap C is not prevented.

In the first and second embodiments above, an example is shown in which the configuration of the backlight unit 10 (20) around each LED 1 is the same with each other, however, the present invention is not limited to this. For example, the configuration of the backlight unit 10 around the LED 1 in accordance with the first embodiment and the configuration of the backlight unit 20 around the LED 1 in accordance with the second embodiment can be utilized for different LEDs in a single backlight unit.

In the first and second embodiments above, examples of the backlight unit of the display device are shown as the lighting device of the present invention, however, the present invention is not limited to this. For example, the present invention may be applied to a lighting device other than the backlight unit of the display device. For example, the present invention may be applied to a display device with plane light emission (an edge-lit type display device).

In the first and second embodiments above, examples of the liquid crystal television device are shown as the display device of the present invention, however, the present invention is not limited to this. For example, the present invention may be applied to a display device other than a liquid crystal television device. For example, the present invention may be applied to a general display device, such as a display device for a PC (personal computer).

In the first and second embodiments above, examples of a configuration in which the plurality of the LEDs 1 (the light sources) are arranged in a matrix in the XY directions are shown, however, the present invention is not limited to this. In the present invention, for example, the plurality of the LEDs 1 (the light sources) may be arranged in a row or in a staggered manner. The plurality of the LEDs 1 (the light sources) may also be arranged according to a predetermined rule.

In the first and second embodiments above, an example is shown in which the light source is an LED, however, the present invention is not limited to this. The light source may be a light emitter other than an LED (e.g., a light bulb, a fluorescent lamp, etc.).

(1) In view of the state of known technology and in accordance with a first aspect of the invention, a lighting device comprises a substrate, a light source and a reflective sheet. The light source is fixed relative to a surface of the substrate with a gap therebetween. The reflective sheet is provided to cover the surface of the substrate. The reflective sheet includes first and second portions that are separated with respect to each other and are arranged with respect to each other in a first direction along the surface of the substrate. The reflective sheet is configured such that both the first and second portions are inserted into the gap between the light source and the surface of the substrate as viewed from a perpendicular direction that is perpendicular to the surface of the substrate, or such that one of the first and second portions extends through the gap between the light source and the surface of the substrate to a vicinity of the other one of the first and second portions that is provided outside of the light source as viewed from the perpendicular direction. Specifically, the light source can be fixed relative to the surface of the substrate in a state spaced apart from the surface of the substrate, for example. The reflective sheet can be configured to expand and contract with heat, for example. The first portion can extend from one side with respect to the light source in the first direction as viewed from the perpendicular direction, and the second portion can extend from the other side with respect to the light source in the first direction as viewed from the perpendicular direction, for example. Here, the vicinity of the other one of the first and second portions means both the position of the other one of the first and second portions itself and near the other one of the first and second portions.

In the lighting device according to the first aspect of this invention, as described above, both the first portion of the reflective sheet and the second portion of the reflective sheet are inserted into the gap between the light source and the surface of the substrate as viewed from the perpendicular direction. Thus, the formation of an area where the surface of the substrate is exposed between the reflective sheet and the light source as viewed from the perpendicular direction can be suppressed. Furthermore, as described above, one of the first portion of the reflective sheet and the second portion of the reflective sheet is provided to extend through the gap between the light source and the surface of the substrate to the vicinity of the other one of the first portion of the reflective sheet and the second portion of the reflective sheet provided outside the light source as viewed from a perpendicular direction. Thus, compared to the case where the reflective sheet is not provided between the other one of the first portion of the reflective sheet and the second portion of the reflective sheet and the light source, as one of the first portion of the reflective sheet and the second portion of the reflective sheet extends to the vicinity of the other one of the first portion of the reflective sheet and the second portion of the reflective sheet (between the other one of the first portion of the reflective sheet and the second portion of the reflective sheet and the light source), the area of the surface of the substrate to be exposed can be made relatively small. As a result of these, it is possible to suppress a decrease in the reflection efficiency of the light in the lighting device (the display device).

(2) In accordance with a preferred embodiment according to the lighting device mentioned above, the reflective sheet is configured such that a thermal expansion amount of the reflective sheet in the first direction is greater than a thermal expansion amount of the reflective sheet in a second direction that is along the surface of the substrate and is perpendicular to the first direction. Specifically, the reflective sheet is configured such that the amount of expansion and contraction by heat in the first direction, in which each of the first and second portions extends, is greater than the amount of expansion and contraction by heat in the second direction, for example. With this configuration, the amount of expansion and contraction by heat of each of the first portion of the reflective sheet and the second portion of the reflective sheet in the first direction is relatively large, and thus it is particularly effective in suppressing contact between the light source and the reflective sheet that at least one of the first portion of the reflective sheet and the second portion of the reflective sheet is configured to be inserted into the gap between the surface of the substrate and the light source.

(3) In accordance with a preferred embodiment according to any one of the lighting devices mentioned above, both the first and second portions of the reflective sheet are inserted into the gap between the light source and the surface of the substrate as viewed from the perpendicular direction, and the first and second portions of the reflective sheet in a state of not being expanded or contracted by heat overlap with the light source as viewed from the perpendicular direction by lengths in the first direction that are greater than an amount by which the reflective sheet contracts by heat. Specifically, the length of an overlapping portion between the first portion of the reflective sheet in the state of not being expanded or contracted by heat and the light source in the first direction and the length of an overlapping portion between the second portion of the reflective sheet in the state of not being expanded or contracted by heat and the light source in the first direction as viewed from the perpendicular direction are each greater than the amount by which the reflective sheet contracts by heat, for example. With this configuration, each of the first portion of the reflective sheet and the second portion of the reflective sheet can be suppressed from exiting the gap between the light source and the surface of the substrate even when the reflective sheet is contracted due to low temperature heat. As a result, the area of the surface of the substrate to be exposed can be suppressed from becoming large.

(4) In accordance with a preferred embodiment according to any one of the lighting devices mentioned above, the first and second portions of the reflective sheet are spaced apart from each other. With this configuration, compared to the case where the first portion of the reflective sheet and the second portion of the reflective sheet are in contact with each other, the length of at least one of the first portion of the reflective sheet and the second portion of the reflective sheet that are inserted into the gap between the light source and the surface of the substrate can be shortened. As a result, the work of inserting at least one of the first portion of the reflective sheet and the second portion of the reflective sheet into the gap between the light source and the surface of the substrate can be made easier.

(5) In accordance with a preferred embodiment according to any one of the lighting devices mentioned above, the light source includes a phosphor and a package that houses the phosphor, and both the first and second portions of the reflective sheet in the state of not being expanded or contracted by heat at least partially overlap with the phosphor of the light source as viewed from the perpendicular direction.

(6) In accordance with a preferred embodiment according to any one of the lighting devices mentioned above, the one of the first and second portions of the reflective sheet extends through the gap between the light source and the surface of the substrate to the vicinity of the other one of the first and second portions of the reflective sheet that is provided outside of the light source, and the first and second portions of the reflective sheet in a state of being expanded by heat overlap with each other. Specifically, each of the first portion of the reflective sheet and the second portion of the reflective sheet can be arranged to be capable of overlapping with each other by being expanded by heat. With this configuration, when each of the first portion of the reflective sheet and the second portion of the reflective sheet is expanded by heat, the formation of an area where the surface of the substrate is exposed between the first portion of the reflective sheet and the second portion of the reflective sheet can be easily suppressed.

(7) In accordance with a preferred embodiment according to any one of the lighting devices mentioned above, the first and second portions of the reflective sheet have end surfaces that are disposed opposite relative to each other without overlapping with each other in a state of not being expanded or contracted by heat. Specifically, the first portion of the reflective sheet in the state of not being expanded or contracted by heat and the second portion of the reflective sheet in the state of not being expanded or contracted by heat are provided such that the end surfaces thereof are disposed opposite relative to each other without overlapping with each other, for example. With this configuration, the first portion of the reflective sheet in the state of not being expanded or contracted by heat and the second portion of the reflective sheet in the state of not being expanded or contracted by heat are disposed opposite relative to each other, thereby the first and second portions can easily overlap with each other when the reflective sheet is expanded by heat, while suppressing the first portion and the second portion from overlapping with each other at room temperature.

(8) In accordance with a preferred embodiment according to any one of the lighting devices mentioned above, the light source includes a phosphor and a package that houses the phosphor, and the one of the first and second portions of the reflective sheet at least partially overlap with the phosphor of the light source as viewed from the perpendicular direction.

(9) In accordance with a preferred embodiment according to any one of the lighting devices mentioned above, the lighting device further comprises a soldered portion fixing the light source relative to the surface of the substrate by bonding both an end portion of the light source in a second direction that is along the surface of the substrate and is perpendicular to the first direction to the surface of the substrate. With this configuration, the soldered portion is provided to bond the end portions of the light source in the second direction to the surface of the substrate, thereby it can be suppressed that the insertion of at least one of the first portion and the second portion extending along the first direction into the gap between the light source and the surface of the substrate is interfered by the soldered portion.

(10) In accordance with a preferred embodiment according to any one of the lighting devices mentioned above, the light source has a rectangular shape as viewed from the perpendicular direction, and the reflective sheet includes an opening that exposes the soldered portion and extends along each of a pair of edges of the light source extending along the first direction as viewed from the perpendicular direction. With this configuration, the soldered portion can be provided along the first direction in the opening of the reflective sheet. As a result, a contact area between each of the light source and the surface of the substrate and the soldered portion can be easily increased. Thus, the light source can be more stably fixed to the surface of the substrate.

(11) In accordance with a preferred embodiment according to any one of the lighting devices mentioned above, the first portion extends from one side of the light source along the first direction, and the second portion extends from the other side of the light source along the first direction.

(12) In accordance with a preferred embodiment according to any one of the lighting devices mentioned above, the light source is fixed relative to the surface of the substrate in a state spaced apart from the surface of the substrate.

(13) In accordance with a preferred embodiment according to any one of the lighting devices mentioned above, the gap between the light source and the surface of the substrate extends along an entire length of the light source in the first direction.

(14) In view of the state of known technology and in accordance with a second aspect of the invention, a display device comprises a display and any one of the lighting devices mentioned above. Specifically, the display device comprises a display, a substrate, a light source, a substrate and a reflective sheet. The light source emits light to the display and is fixed relative to a surface of the substrate with a gap therebetween. The reflective sheet is provided to cover the surface of the substrate. The reflective sheet includes first and second portions that are separated with respect to each other and are arranged with respect to each other in a first direction along the surface of the substrate. The reflective sheet is configured such that both the first and second portions are inserted into the gap between the light source and the surface of the substrate as viewed from a perpendicular direction that is perpendicular to the surface of the substrate, or such that one of the first and second portions extends through the gap between the light source and the surface of the substrate to a vicinity of the other one of the first and second portions that is provided outside of the light source as viewed from the perpendicular direction. Specifically, the light source can be fixed relative to the surface of the substrate in a state spaced apart from the surface of the substrate, for example. The reflective sheet can be configured to expand and contract with heat, for example. The first portion can extend from one side with respect to the light source in the first direction as viewed from the perpendicular direction, and the second portion can extend from the other side with respect to the light source in the first direction as viewed from the perpendicular direction, for example.

In the display device according to the second aspect of this invention, as described above, both the first portion of the reflective sheet and the second portion of the reflective sheet are inserted into the gap between the light source and the surface of the substrate as viewed from the perpendicular direction. Thus, the formation of an area where the surface of the substrate is exposed between the reflective sheet and the light source as viewed from the perpendicular direction can be suppressed. Furthermore, as described above, one of the first portion of the reflective sheet and the second portion of the reflective sheet is provided to extend through the gap between the light source and the surface of the substrate to the vicinity of the other one of the first portion of the reflective sheet and the second portion of the reflective sheet provided outside the light source as viewed from a perpendicular direction. Thus, compared to the case where the reflective sheet is not provided between the other one of the first portion of the reflective sheet and the second portion of the reflective sheet and the light source, as one of the first portion of the reflective sheet and the second portion of the reflective sheet extend to the vicinity of the other one of the first portion of the reflective sheet and the second portion of the reflective sheet (between the other one of the first portion of the reflective sheet and the second portion of the reflective sheet and the light source), the area of the surface of the substrate to be exposed can be made relatively small. As a result of these, it is possible to provide a display device capable of suppressing a decrease in the reflection efficiency of the light in the lighting device (the display device).

(15) In accordance with a preferred embodiment according to the display device mentioned above, the reflective sheet is configured such that a thermal expansion amount of the reflective sheet in the first direction is greater than a thermal expansion amount of the reflective sheet in a second direction that is along the surface of the substrate and is perpendicular to the first direction. Specifically, the reflective sheet is configured such that the amount of expansion and contraction by heat in the first direction, in which each of the first and second portions extends, is greater than the amount of expansion and contraction by heat in the second direction, for example. With this configuration, the amount of expansion and contraction by heat of each of the first portion of the reflective sheet and the second portion of the reflective sheet in the first direction is relatively large, and thus it is particularly effective in providing a display device in which contact between the light source and the reflective sheet is suppressed that at least one of the first portion of the reflective sheet and the second portion of the reflective sheet is configured to be inserted into the gap between the surface of the substrate and the light source.

(16) In accordance with a preferred embodiment according to any one of the lighting devices mentioned above, the light source includes a phosphor and a package that houses the phosphor.

(17) In accordance with a preferred embodiment according to any one of the lighting devices mentioned above, the gap between the light source and the surface of the substrate is greater than a thickness of the reflective sheet.

(18) In accordance with a preferred embodiment according to any one of the lighting devices mentioned above, both the first and second portions of the reflective sheet in a state of being contracted by heat at least partially overlap with the package of the light source as viewed from the perpendicular direction.

(19) In accordance with a preferred embodiment according to any one of the lighting devices mentioned above, the first and second portions of the reflective sheet in a state of being contracted by heat are spaced apart from each other in the first direction.

(20) In accordance with a preferred embodiment according to any one of the lighting devices mentioned above, the first portion extends from the one side of the light source towards the second portion, and the second portion extends from the other side of the light source towards the first portion.

According to the present invention, it is possible to suppress a decrease in the reflection efficiency of light in the lighting device (the display device) as described above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a liquid crystal television device in an upright position. Accordingly, these directional terms, as utilized to describe the liquid crystal television device should be interpreted relative to a liquid crystal television device in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lighting device comprising:
a substrate;
a light source fixed relative to a front surface of the substrate with a gap therebetween; and
a reflective sheet provided to cover the front surface of the substrate, the reflective sheet including first and second portions that are separated with respect to each other and are arranged with respect to each other in a first direction along the front surface of the substrate, the reflective sheet being configured such that both the first and second portions are inserted into the gap between the light source and the front surface of the substrate as viewed from a perpendicular direction that is perpendicular to the front surface of the substrate,
the light source being fixed relative to the front surface of the substrate at first and second fixing points that are spaced apart from each other in a second direction that is along the front surface of the substrate and is perpendicular to the first direction, and
the first and second portions of the reflective sheet having distal ends, respectively, the distal ends of the first and second portions being disposed between the first and second fixing points in the second direction.

2. The lighting device according to claim 1, further comprising
a pair of soldered portions fixing the light source relative to the front surface of the substrate at the first and second fixing points by bonding end portions of the light source in the second direction.

3. The lighting device according to claim 2, wherein
the light source has a rectangular shape as viewed from the perpendicular direction, and
the reflective sheet includes a pair of openings that expose the soldered portions and extend along edges of the light source extending along the first direction as viewed from the perpendicular direction.

4. The lighting device according to claim 1, wherein
the first portion extends from one side of the light source along the first direction, and
the second portion extends from the other side of the light source along the first direction.

5. The lighting device according to claim 4, wherein
the first portion extends from the one side of the light source towards the second portion, and
the second portion extends from the other side of the light source towards the first portion.

6. The lighting device according to claim 1, wherein
the light source is fixed relative to the front surface of the substrate in a state spaced apart from the front surface of the substrate.

7. The lighting device according to claim 1, wherein
the gap between the light source and the front surface of the substrate extends along an entire length of the light source in the first direction.

8. A display device comprising:
a display; and
the lighting device according to claim 1.

9. The lighting device according to claim 1, wherein
the light source includes a phosphor and a package that houses the phosphor.

10. The lighting device according to claim 1, wherein
the gap between the light source and the front surface of the substrate is greater than a thickness of the reflective sheet.

11. A lighting device comprising:
a substrate;
a light source fixed relative to a front surface of the substrate with a gap therebetween; and
a reflective sheet provided to cover the front surface of the substrate, the reflective sheet including first and second portions that are separated with respect to each other and are arranged with respect to each other in a first direction along the front surface of the substrate,
the reflective sheet being configured such that both the first and second portions are inserted into the gap between the light source and the front surface of the substrate as viewed from a perpendicular direction that is perpendicular to the front surface of the substrate, or such that one of the first and second portions extends through the gap between the light source and the front surface of the substrate toward the other one of the first and second portions that is provided outside of the light source as viewed from the perpendicular direction,
the reflective sheet being configured such that a thermal expansion amount of the reflective sheet in the first direction is greater than a thermal expansion amount of the reflective sheet in a second direction that is along the front surface of the substrate and is perpendicular to the first direction.

12. A display device comprising:
a display; and
the lighting device according to claim 11.

13. A lighting device comprising:
a substrate;
a light source fixed relative to a front surface of the substrate with a gap therebetween; and
a reflective sheet provided to cover the front surface of the substrate, the reflective sheet including first and second portions that are separated with respect to each other and are arranged with respect to each other in a first direction along the front surface of the substrate,
the reflective sheet being configured such that both the first and second portions are inserted into the gap between the light source and the front surface of the substrate as viewed from a perpendicular direction that is perpendicular to the front surface of the substrate,
the first and second portions of the reflective sheet in a state of not being expanded or contracted by heat overlapping with the light source as viewed from the perpendicular direction by lengths in the first direction that are greater than an amount by which the reflective sheet contracts by heat.

14. The lighting device according to claim 13, wherein
the first and second portions of the reflective sheet are spaced apart from each other.

15. The lighting device according to claim 13, wherein
the light source includes a phosphor and a package that houses the phosphor, and
both the first and second portions of the reflective sheet in the state of not being expanded or contracted by heat at least partially overlap with the phosphor of the light source as viewed from the perpendicular direction.

16. The lighting device according to claim 15, wherein
both the first and second portions of the reflective sheet in a state of being contracted by heat at least partially overlap with the package of the light source as viewed from the perpendicular direction.

17. A lighting device comprising:
a substrate;
a light source fixed relative to a front surface of the substrate with a gap therebetween; and
a reflective sheet provided to cover the front surface of the substrate, the reflective sheet including first and second portions that are separated with respect to each other and are arranged with respect to each other in a first direction along the front surface of the substrate,
the reflective sheet being configured such that one of the first and second portions extends through the gap between the light source and the front surface of the substrate toward the other one of the first and second portions that is provided outside of the light source as viewed from the perpendicular direction.

18. The lighting device according to claim 17, wherein the first and second portions of the reflective sheet in a state of being expanded by heat overlap with each other.

19. The lighting device according to claim 18, wherein the first and second portions of the reflective sheet have end surfaces that are disposed opposite relative to each other without overlapping with each other in a state of not being expanded or contracted by heat.

20. The lighting device according to claim 18, wherein the light source includes a phosphor and a package that houses the phosphor, and
the one of the first and second portions of the reflective sheet at least partially overlap with the phosphor of the light source as viewed from the perpendicular direction.

21. The lighting device according to claim 18, wherein the first and second portions of the reflective sheet in a state of being contracted by heat are spaced apart from each other in the first direction.

* * * * *